(12) United States Patent
Tailor et al.

(10) Patent No.: US 9,821,508 B2
(45) Date of Patent: Nov. 21, 2017

(54) APPARATUS FOR APPLYING HEAT SHRINKABLE CASINGS ONTO PREINSULATED PIPE JOINTS

(71) Applicant: ShawCor Ltd., Toronto, Ontario (CA)

(72) Inventors: Dilip Tailor, Mississauga (CA); Pascal Laferriere, Toronto (CA); Jeremy Joseph Ellis, Toronto (CA); Mark Brandon, Toronto (CA); Pawel Boczkowski, Mississauga (CA); Patrick Marc Arbour, Toronto (CA)

(73) Assignee: ShawCor Ltd., Toronto, Ontario (CA)

( * ) Notice: Subject to any disclaimer, the term of this patent is extended or adjusted under 35 U.S.C. 154(b) by 372 days.

(21) Appl. No.: 14/416,665

(22) PCT Filed: Jul. 22, 2014

(86) PCT No.: PCT/CA2014/050692
§ 371 (c)(1),
(2) Date: Jan. 23, 2015

(87) PCT Pub. No.: WO2015/010204
PCT Pub. Date: Jan. 29, 2015

(65) Prior Publication Data
US 2016/0001494 A1    Jan. 7, 2016

Related U.S. Application Data

(60) Provisional application No. 61/857,455, filed on Jul. 23, 2013.

(51) Int. Cl.
*H05B 3/34*    (2006.01)
*B29C 63/00*    (2006.01)
(Continued)

(52) U.S. Cl.
CPC .......... *B29C 63/0069* (2013.01); *B29C 63/42* (2013.01); *B29C 65/1412* (2013.01);
(Continued)

(58) Field of Classification Search
CPC ........................................................ H05B 3/34
See application file for complete search history.

(56) References Cited

U.S. PATENT DOCUMENTS 3,731,051 A * 5/1973 Ellersick .................. C21D 9/50
219/162
4,349,724 A * 9/1982 Ellersick .................. C21D 1/34
219/535
(Continued)

FOREIGN PATENT DOCUMENTS

CA      1197963 A1    12/1985
CN      202986105 U    6/2013
(Continued)

OTHER PUBLICATIONS

International Search Report for corresponding patent application No. PCT/CA2014/050692 dated Sep. 5, 2014.

*Primary Examiner* — Jeff Aftergut
(74) *Attorney, Agent, or Firm* — Renner, Otto, Boisselle & Sklar, LLP

(57) ABSTRACT

An automated heat shrink device, useful for forming a connection between two tubular sections having a polymeric outer surface jacket, for example, a connection between two sections of a district heating pipeline, and a method of use thereof. The device is configured such that it requires minimal clearance to either side of the pipeline when being used.

14 Claims, 16 Drawing Sheets

(51) Int. Cl.
   *B29C 65/66* (2006.01)
   *B29C 65/14* (2006.01)
   *B29C 65/78* (2006.01)
   *B29C 65/50* (2006.01)
   *F16L 59/20* (2006.01)
   *B29C 63/42* (2006.01)
   *B29C 65/00* (2006.01)
   *B29L 23/00* (2006.01)

(52) U.S. Cl.
   CPC ...... *B29C 65/1467* (2013.01); *B29C 65/5057* (2013.01); *B29C 65/66* (2013.01); *B29C 65/7823* (2013.01); *B29C 65/7826* (2013.01); *B29C 66/1122* (2013.01); *B29C 66/53241* (2013.01); *B29C 66/727* (2013.01); *B29C 66/72321* (2013.01); *B29C 66/73715* (2013.01); *B29C 66/87445* (2013.01); *F16L 59/20* (2013.01); *H05B 3/34* (2013.01); *B29C 66/71* (2013.01); *B29C 66/73751* (2013.01); *B29C 66/73755* (2013.01); *B29C 66/73921* (2013.01); *B29C 66/9121* (2013.01); *B29C 66/91313* (2013.01); *B29C 66/91315* (2013.01); *B29C 66/91651* (2013.01); *B29L 2023/225* (2013.01)

(56) References Cited

U.S. PATENT DOCUMENTS

| | | | |
|---|---|---|---|
| 6,583,390 | B1 | 6/2003 | Vetrano et al. |
| 9,080,701 | B2* | 7/2015 | George .............. F16L 13/0272 |
| 2002/0098457 | A1 | 7/2002 | Brown et al. |
| 2012/0037297 | A1* | 2/2012 | Nardo ................... B29C 61/00 156/86 |

FOREIGN PATENT DOCUMENTS

| | | |
|---|---|---|
| WO | 2008/033927 A2 | 3/2008 |
| WO | 2010/102392 A1 | 9/2010 |
| WO | 2010/130345 A1 | 11/2010 |
| WO | 2012/094765 A1 | 7/2012 |
| WO | 2013/067631 A1 | 5/2013 |
| WO | 2013/068460 A1 | 5/2013 |

* cited by examiner

APPARATUS FOR APPLYING HEAT SHRINKABLE CASINGS ONTO PREINSULATED PIPE JOINTS

FIELD OF THE INVENTION

The present invention relates to an automated heat shrink device, useful for forming a connection between two tubular sections having a polymeric outer surface jacket, for example, a connection between two sections of a district heating insulated pipeline, and a method of use thereof.

BACKGROUND OF THE INVENTION

Typically, preinsulated pipe used, for example, in district heating pipeline, comprises an inner metal pipe, which is insulated with suitable foam, said foam coated with an outer polymer surface jacket. The preinsulated pipe is made in lengths, each length having a short area at each end for which the foam coating and outer surface jacket is absent, to allow the exposed ends of the pipe to be welded together at a pipe joint. Once the pipe is welded together at the pipe joint, one of a variety of available casings is used to cover and protect the pipe joint. For example, the casing may be in the form of a heat shrinkable casing applied around the welded pipe joint. In this case, the casing is fitted to the pipe joint, then heat shrunk down onto the edges of the polymer surface jacket proximal to the joint. The casing is longitudinally wide enough to overlap the polymer surface jacket of the two sections of pipe. The overlapping area has a suitable adhesive between the casing and the jacket to provide a seal, as described for example in U.S. Pat. No. 4,521,470, which is incorporated herein by reference.

Such casings can be pre-formed cylindrical casings, which are (in pre-shrunk state) of a slightly larger diameter than the pipe. In the case of such casing, the casing is slid around one of the pipes before the pipe joint is welded, then positioned around the pipe joint after the welding of the two pipes. Such casing may also be made from a flexible sheet or film, which is positioned around the circumference of the pipe joint after the pipe joint is welded. In this case, the flexible sheet or film typically has two opposed, overlapping edges, lying longitudinally across the pipe joint; these overlapping edges are bonded or fused together before the casing is heat shrunk.

In many cases, the casing is bonded to the polymeric outer surface jacket of the pipe using an adhesive, which is either applied to the outer surface jacket or which is pre-existing as a separate, inner layer of the casing.

Once the casing is bonded or fused to the polymeric outer surface jacket of the pipe on either side of the pipe joint, the area surrounding the pipe joint, between the casing and the pipe, is filled with suitable insulation, typically in the form of a foam which is pressure injected through a small hole in the casing. A second small hole in the casing allows the air being displaced by the foam to exit the area. In this manner, the casing is, in effect, creating a mold that surrounds the exposed pipe area around a pipe joint, which is then filled with foam insulation, preferably and typically similar in insulation characteristics and/or composition to the foam coating found under the outer surface jacket.

Once the casing and foam is applied, typically, the pipe joint has similar or better characteristics, in terms of strength, rigidity, and insulation value, as the rest of the pipe.

Thus, a known method of installing a pipeline in the field includes (1) welding together the exposed ends of a pipe at a pipe joint; (2) applying a casing in the form of a flexible sheet having a first, adhesive layer and a second, polymeric layer, so that the flexible sheet overlaps the outer surface jacket of the two pipes being connected; (3) bonding the overlapping edges of the flexible sheet to form a casing surrounding the pipe joint, so that the first, adhesive layer becomes an inner layer; (4) heat shrinking the casing around the pipe joint, while simultaneously but indirectly heating the inner adhesive layer of the casing to bond the casing to the polymeric outer surface jackets of the two pipes on either side of the pipe joint; then (5) injecting foam insulation into the gap between the pipe joint and the casing. Often, such a method also requires pre-heating of the polymeric outer surface jacket of the two pipe sections in order to help activate the adhesive and promote the bond.

A second, known method of installing a pipeline in the field includes (1) sliding a pre-formed cylindrical casing around the exposed end of a pipe, and displacing it so that the exposed end of the pipe is exposed and accessible; (2) welding together the exposed ends of a pipe at a pipe joint; (3) sliding back the casing so that it covers the pipe joint and so that the casing overlaps the outer surface jacket of the two pipe lengths being connected; (4) heat shrinking the casing around the pipe joint, while simultaneously but indirectly heating the inner adhesive layer of the casing to bond the casing to the polymeric outer surface jackets of the two pipes on either side of the pipe joint; then (5) injecting foam insulation into the gap formed between the pipe joint and the casing. Often, such a method also requires pre-heating of the polymeric outer surface jacket of the two pipe sections in order to help activate the adhesive and promote the bond.

For both of these methods, each side of the casing can be heated and bonded to the outer surface jacket sequentially by applying heat to one end of the casing, then to the other, or simultaneously by applying heat to both ends of the casing at the same time. In many cases, there is as much as a 1 inch gap between the outer surface jacket and the casing; part of the challenge in applying a casing is to provide a uniform gap, and shrinking the casing evenly around the outer surface jacket.

In these known methods, typically the heat shrinkable casing is made from a cross-linked polyethylene or an uncrosslinked polyethylene. The shrinking is affected by applying heat to the casing. The common method used in the industry to apply the heat by use of torch flame with a suitable gas fuel such as propane. In the process the casing shrinks and provides hoop stress to conform to the underlying substrate and also affects the bonding of the adhesive to the substrate. Typically the end zones of the casing overlapping onto the mainline jacket are heated and shrunk. The widths of these end zones vary from 50 mm-250 mm.

When heat shrinkable casings are applied over the pipe joint and shrunk down using a hand held flame torch, this manual operation produces an imperfect installation because of uneven heating. Artful application of the torch is critical. For example, windy conditions may spread the flame and shrink the edges of the casing prematurely. Further, unless the torch is moved carefully, the torch flame may burn the casing and cause it to split. Where a large area needs to be heated, it becomes difficult or impossible to maintain the heat while the casing is being shrunk; this leads to wrinkling of the casing, imperfect installation due to trapped air, tearing, or scorching of the heat shrink material. Sometimes, it also results in improper or incomplete adherence of the heat shrink material around joint, especially at the bottom. The district heating pipelines are usually laid in trenches with two lines running in parallel, one supplying the hot water and a return line bringing back cold water to the central station. The spacing between these pipes and also the to the adjacent walls of the ditch are often quite narrow, with typically only 12 inches-40 inches available between the pipes, and as little as 7-9 inches of clearance between the pipe and the bottom of the trench. Therefore there is little room to maneuver the torch flame to apply even and effective heating on the casing all the way around. In many cases, the application and shrinking of a casing is done in a remote, awkward location, and as such, it is highly advantageous when the heating device or apparatus, or, for example, the torch flame, is portable and can be easily carried and maneuvered by one person. In other cases, the application and shrinking of a casing is done very close to a road or walkway—often less than 25 feet away, and thus the application and shrinking must be done in a safe and efficient manner. Quite often, use of open torch is prohibited. The trench in which the pipes are located is often quite narrow, and it is not easy for a person to get down into it while carrying heavy equipment. Typically, in residential areas, the district heating pipelines share paths with other pipe and telecom networks, and as such there are many obstructions from crossing pipe networks and telecom and services cabling. The trenches are muddy, wet, and dirty, and unfortunately, typically, the cleaner and dryer the area, the better the bond between the casing and the pipe.

Before the casing is applied over the joint, the joint should be prepared in the following manner: the jacket pipe coating is cleaned and imparted roughness by abrading or light grit blasting. The joint usually requires preheating to remove moisture, but more importantly to achieve certain temperature to activate the adhesive to obtain a good bond. For example, for polyethylene type shrink casings, where a typical adhesive may have melting point of around 90° C., the preheat of the pipe is often 60-90° C. This, of course, can vary depending on application and service conditions.

The sizes and configurations of torches and heating implements vary greatly in the field, as do the sizes and configurations of the pipes to be treated. Sometimes, large powerful torches are used. These tend to flare out greatly and do not allow focused heating of the casing. Sometimes four torches are used to shrink a casing to get fast production rates, with two operators on one side of the pipe and two on the other, especially for pipes of large sizes. This practice makes it near impossible to apply even, consistent heat throughout the area to be heated, to accurately control the amount of heat applied to different areas to be shrunk, or to accurately control the order in which the various areas are to be heated. Often, in order to obtain proper adhesion of the casing, it is required to maintain a minimum preheat temperature of the substrate. When less torches are employed, certain areas, for example, the outer surface jacket adjacent the opposite end of the joint, tends to have cooled below the minimum preheat temperature, so that the casing does not bond thereto. Therefore during the shrinking operation, extra prolonged heat has to be applied to casing area overlapping onto the mainline coating in order raise the adhesive-outer surface jacket interface to sufficient temperature to achieve a sound bond. With the flame torches, this is difficult as prolonged heating can scorch and damage the casing, and sometimes lead to splitting. The need for the extra prolonged heating is exacerbated by the fact the substrate is cooling down since there is gap between the casing and the substrate jacket pipe. Therefore, focused prolonged heating is imperative to achieve a good bond on the overlap jacket. Presence of wind and inclement weather would only aggravate this problem. The prolonged extra heat can also scorch and damage the adjacent polymeric jacket and also create gassing in the underlying foam insulation.

The ability to obtain a solid, strong bond between the outer surface jacket and the casing is key for maintaining the longevity of the pipeline. Repairing or re-casing joints that have failed is very expensive and difficult, since, in many cases, the pipeline is buried. One problem with torch heating is that the casing tends to shrink into the gap between the outer surface jacket of the two pipes being connected. This creates a discrepancy in the diameter of the pipe, a smaller amount of insulation at the joint, and weakening of the casing at the joint. One way to avoid such unwanted excess shrinkage is to provide heat shields, which add expense and complexity.

The present invention provides apparatus that at least in preferred embodiments may avoid the above-noted problems. Specifically, the apparatus is compact, lightweight, scalable and modular, robust and environmentally tolerant, inherently safe and reliable, similar in operation to existing field equipment, flexible, adaptable, and simple to make, use, and operate.

SUMMARY OF THE INVENTION

According to one aspect of the present invention is an apparatus for heating an elongate tubular article, comprising a frame member adapted to be disposed around said article, said frame member having a plurality of heater devices adapted to heat the article and attached to said frame member, said frame member having a certain amount of flexibility such that it can be positioned, or wrapped, on and off the article and directly or indirectly clamped thereto in a configuration such that the heater devices are positioned to essentially evenly heat the entire circumference of the article. The apparatus is of a slim enough profile that it can be easily wrapped around and/or clamped to said article, in instances where said elongate tubular article has 12 inches or less of horizontal (side) clearance and nine inches or less of vertical clearance (below).

In addition, the apparatus is of a design such that it is easily carried over the shoulder of a person utilizing it, and can be easily carried with one hand, along with a power supply for powering it, by one person. This ability to carry the power supply unit necessitates that it has low enough weight, and this limits the power of the unit. It was determined that one person can carry up to 100 lbs weight. Power units in this weight range were found to supply power of up to 25 KW. After experimentations, it was determined that, in order to shrink the casing, the apparatus should have power in the range of 0.5-20 KW, preferably 0.5-10 KW. For example, a 6 KW power supply from Migatronics Model P200-AC/DC weighed 49 lbs (22 kg). Similarly a 12 KW unit weighed 66 lb and a 18 KW unit weighed 73 lbs.

The apparatus has the further advantages that it is of a flexible design, like a blanket, that can be wrapped around an article of virtually any shape, for example, only semi-tubular articles, or articles with bends or imperfections.

The apparatus also has the further advantage that it is modular such that it can be configured, and wrapped around, an article of virtually any diameter, by addition or removal of heating modules.

According to certain embodiments, the elongate tubular article is a casing surrounding a joint in a district heating pipeline. In certain other embodiments, the elongate tubular article is the district heating pipeline itself.

According to certain embodiments, the apparatus is configured such that, when positioned on the article, it does not contact the article.

In certain embodiments, the article is configured such that it can be clamped directly to the pipeline. In other embodiments, the article is configured such that it does not actually contact the pipeline itself, instead clamping directly to the casing surrounding the joint in the district heating pipeline.

According to certain embodiments, the apparatus is configured such that, when positioned on the article, it contacts an outer surface jacket of the district heating pipeline. The contact may be a clamping contact.

According to certain other embodiments, the apparatus is configured such that, when positioned on the article, it does not contact the outer surface jacket of the district heating pipeline. Instead, it contacts the casing, itself positioned surrounding the joint in the district heating pipeline. The contact may be a clamping contact.

According to one aspect of the present invention, the apparatus further comprises a controller for controlling the heater device.

In certain embodiments, the heater device comprises a plurality of individually controllable heating zones, which may be circumferential or longitudinal. In other embodiments, the heater device has a fixed, but graduated heating from one end of the heater device to the other.

In certain embodiments, the heater device comprises a plurality of user-replaceable heating panels.

In certain embodiments, the heater device is an infra-red heater device, for example, a thin stamped sheet or foil strip which may be configured in a sinusoidal or linear configuration to form a heating plane providing relatively even heat, infrared elements in the form of quartz tubes or ceramic tiles, or diffused gas combusting devices such as a catalytic panel heater. In a preferred embodiment, the heater device is a resistive element providing both conventional and infra-red heat.

According to a further aspect of the invention is provided an apparatus for heating of a heat shrinkable casing surrounding and disposed around a joint in a pre-insulated pipe, for sealing or bonding said one or more end portions to an outer surface jacket of said pipe, said apparatus comprising: a plurality of components, each component having: a frame, said frame comprising a mount region with a mounting face; said frame having attached thereto a heater, said heater comprising a heating plate facing the same general direction as the mounting face and a temperature resistant outer casing; at least one hinge region, the hinge region connecting said plurality of components to one another to form a flexible, articulated length having two ends, said articulated length configured so that the mounting face of each component faces in the same direction; said plurality of components being electrically connected to one another such that a single power source can provide electrical energy to the heating plates; said apparatus also comprising a connecting region capable of connecting the two ends of said articulated length of frames to form a circular array of components each having a heating plate and a mounting face facing the center of the circular array and an outward facing outer casing.

In certain embodiments, the hinge region is located on the frame.

In certain embodiments, the heater further comprises a heat shield located distal to the frame.

In certain embodiments, the apparatus further comprises a temperature resistant spacer on said heating plate to prevent said heating plate from contacting said outer surface jacket when in operation. The temperature resistant spacer may be ceramic.

In certain embodiments, the connecting region is a clamp, for example, a clamp with a stroke of 1-12 inches, preferably about 4 inches.

In certain embodiments, the mounting face comprises a silicon foam or a bilayer of silicon foam and rubber.

In certain embodiments, the hinge region comprises a plurality of connectors, preferably made of rubber or an elastomeric polymer such as polyurethane. The connectors may be fiber reinforced.

In certain embodiments, the apparatus further comprises an alignment spacer at a distal end of the heater, relative to the frame, said alignment spacer protruding away from the heater generally perpendicularly to the heating plate.

In certain embodiments, the apparatus is of a modular configuration, whereby components can be added or removed to vary its overall length.

In certain embodiments, adjacent heaters are connected electrically to form a parallel electrical connection network.

In certain embodiments, adjacent heaters are connected electrically to form a series electrical connection network.

In certain embodiments, the heating element comprises at least two zones, each providing a different level of heat or infra-red energy. The zones may be configured so that each of the zones is an incrementally further distance from the frame. The heating element may also comprise a graduated level of heat or infra-red energy, where, for example, the graduation can be from a portion of the heating element most proximal to the frame to a portion of the heating element most distal to the frame.

In certain embodiments, the heating elements comprise at least one aperture, providing an increased resistance proximal to said aperture relative to a resistance on said heating element distal to said aperture.

According to a further aspect of the invention is provided a method for shrinking a pre-stretched casing to an outer surface jacket of a pipeline at a pipe joint, comprising: wrapping or placing a casing around the pipe joint so that it overlaps the outer surface jacket on either side of the pipe joint; clamping an apparatus as herein described to the casing so that the plurality of components surround the casing, each component with its mounting face clamped to the casing and its heating plate in proximity to a portion of the casing that overlaps the outer surface jacket; and applying electrical energy to the heating plate which utilizes said electrical energy to generate heat, which in turn shrinks the casing to the outer surface jacket.

According to yet a further aspect of the invention is provided a method for shrinking a pre-stretched casing to an outer surface jacket of a pipeline at a pipe joint, comprising: wrapping or placing a casing around the pipe joint so that it overlaps the outer surface jacket on either side of the pipe joint; clamping an apparatus as herein described to the outer surface jacket so that the plurality of components overhang and surround the casing, each component with its mounting face clamped to the outer surface jacket and its heating plate in proximity to a portion of the casing that overlaps the outer surface jacket; and applying electrical energy to the heating plate which utilizes said electrical energy to generate heat, which in turn shrinks the casing to the outer surface jacket. In certain embodiments, the application of electrical energy is a high current, low voltage electrical energy.

According to yet a further aspect of the invention is provided a method of configuring an apparatus as herein described for clamping to a pipe outer surface jacket or casing, comprising: adding or removing components of the apparatus to form an overall apparatus length appropriate for clamping to the desired pipe outer surface jacket or casing. The removing of components may comprise uncoupling the component at the hinge region. The adding of components may comprise coupling an additional component at the hinge region.

According to a further aspect of the invention is provided a method for heating an elongate tubular article disposed around a pipe joint, comprising:

Wrapping an apparatus as herein described around the article; and activating said heater device.

In certain embodiments, when the apparatus is wrapped around the article, the apparatus does not actually contact the article, but instead contacts the pipe only. In other, preferred embodiments, the apparatus does not actually contact the pipe, or has only minimal contact with the pipe, with the principal contact being with the article.

Traditionally a torch flame is used to heat the end zone as shown in FIG. 5. For the present invention, a heating device is wrapped on the outer surface jacket adjacent to the casing end zone, or, in some configurations, on the casing end zone, so that the device surrounds the entire circumference of the casing with an even gap between the device and the casing.

According to a further aspect of the present invention is provided a method for heating a heat shrinkable casing applied around an elongate tubular article, comprising wrapping adjacent to the casing and clamping thereto an apparatus as herein described, and heating said casing with said heater device.

DESCRIPTION

The invention provides apparatus for heating an elongate tubular article, such as a heat shrinkable casing applied around a pipe joint, such as that in a district heating pipeline. The apparatus is capable of being carried over the shoulder of an individual until it is ready to be used, and wrapped around a pipe or casing despite the pipe being proximally flanked by a second, generally parallel pipe, and/or despite the pipe having minimal ground clearance, or being situated in a trench with minimal ground clearance between the pipe and the bottom of the trench, or despite other obstructions proximal to the pipe.

Figure 1:
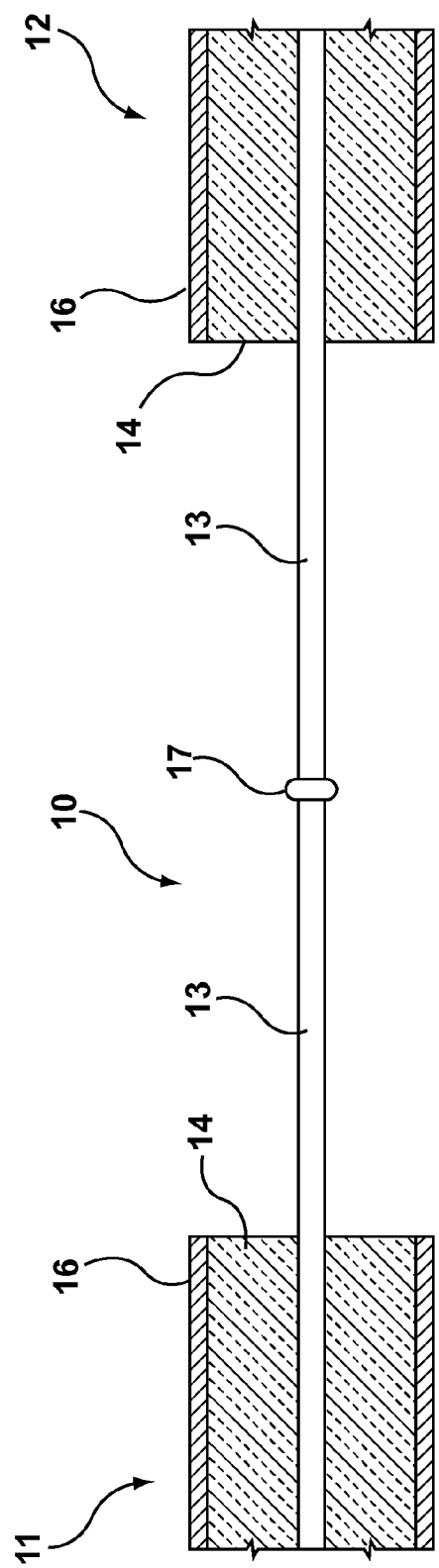
FIG. 1 shows, in cross section, a schematic representation of a typical pipe joint of a district heating pipeline.

FIG. 1 shows a cross-section of a typical district heating preinsulated pipe joint, connecting two sections of district heating pipe, for example, connecting one section of district heating pipe 11 to a district heating pipe pipeline 12. Pipe 13 is typically a steel pipe, surrounded by a layer of insulation 14, for example, foam insulation, which is in turn surrounded by outer surface jacket 16, typically made of a polymeric material, such as polyethylene. The two sections of metal pipe 13 are welded together at joint 17. Also shown is cavity or gap 10, an area surrounding the pipes 13 at pipe joint 17, containing no insulation or outer surface jacket.

Figure 2:
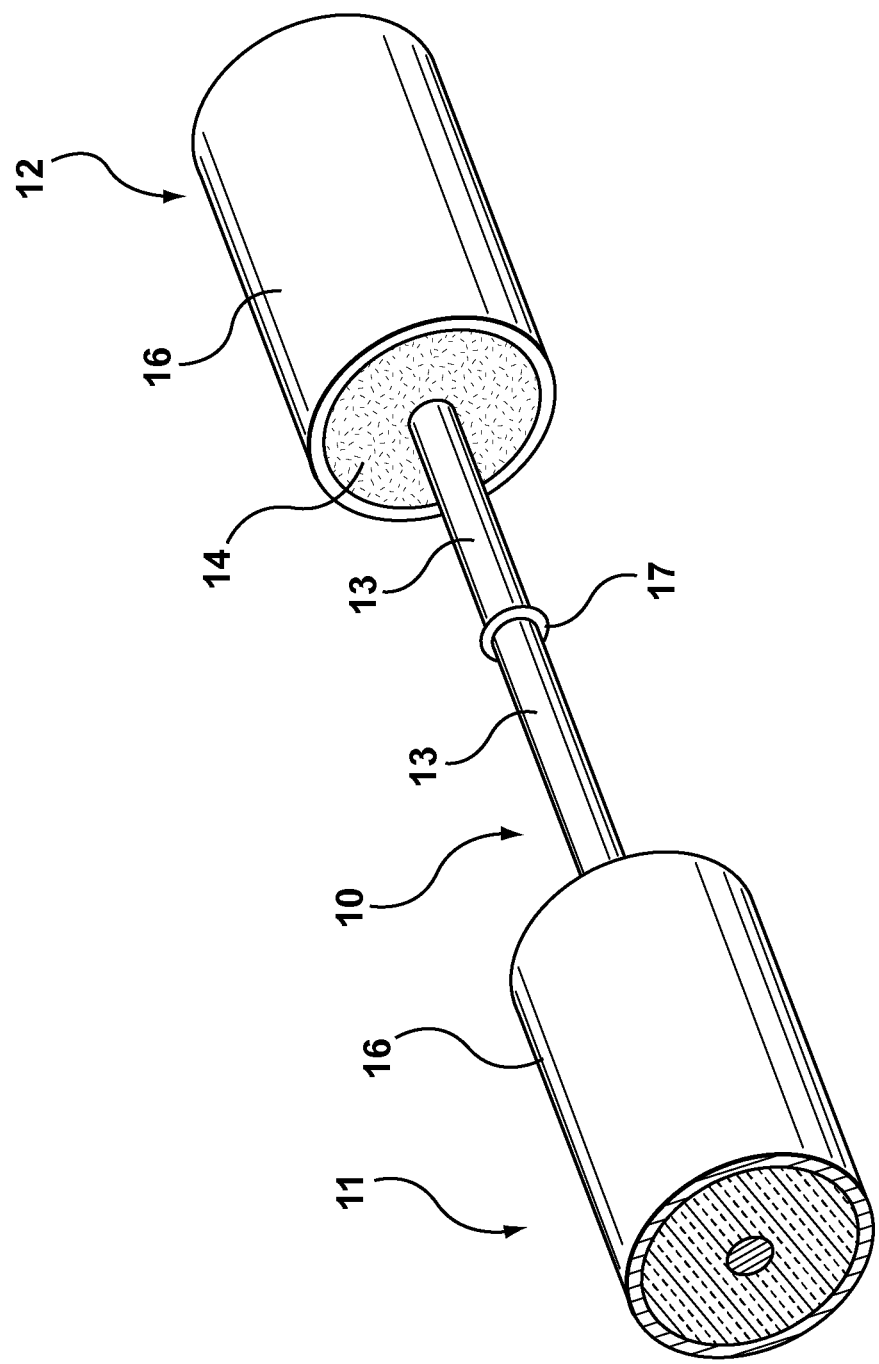
FIG. 2 shows a schematic representation of a three-dimensional rendering of the pipe joint of FIG. 1.

FIG. 2 shows, in somewhat schematic fashion, a perspective view of the pipe joint of FIG. 1.

Figure 3:
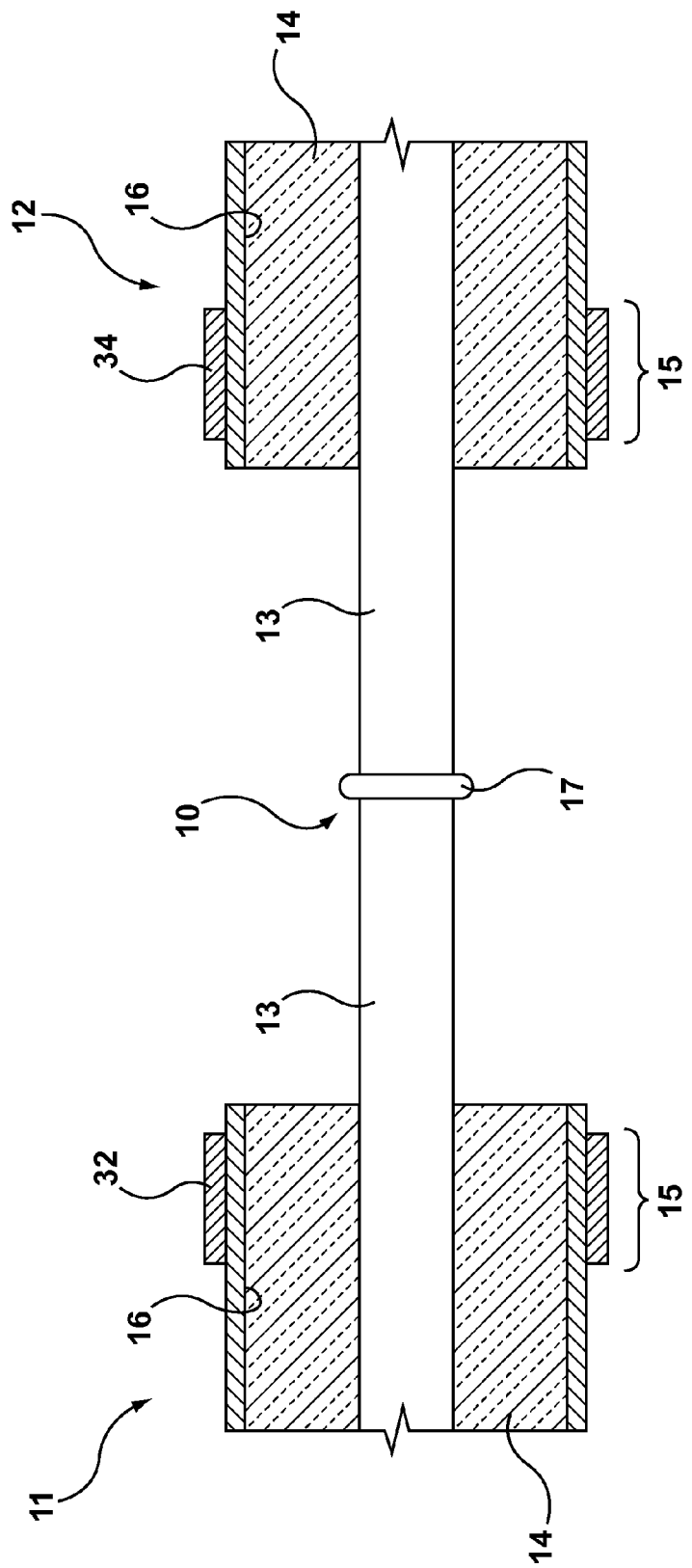
FIGS. 3-5 show prior art methods of applying a casing to a pipe joint.
Figure 4:
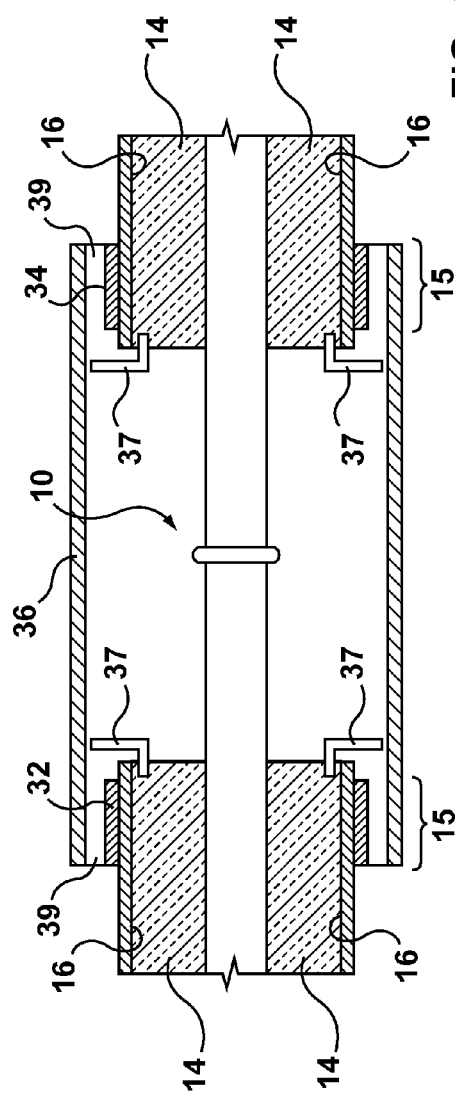
Figure 5:
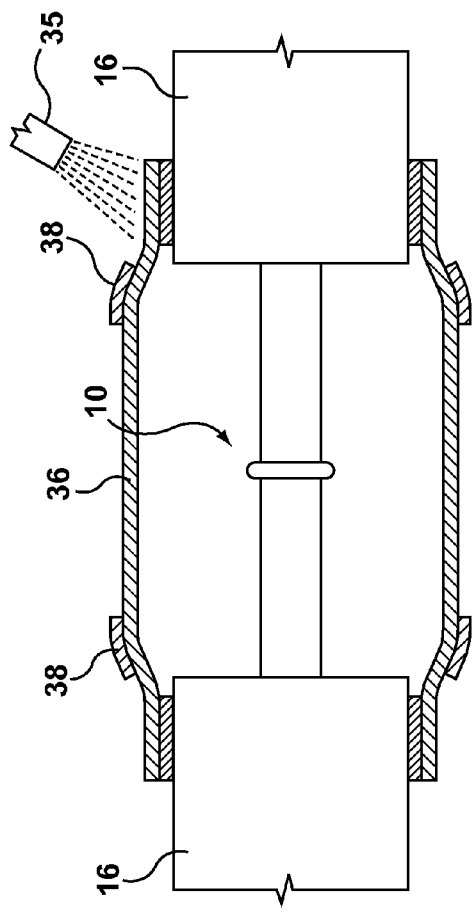

FIGS. 3-5 show three sequential steps in a traditional (prior art) method for application of a casing to a joint in a typical district heating pipe. Pipe 13 is welded at joint 17, and surrounded by insulation 14 and outer surface jacket 16. FIG. 3 shows application of wrapped, adhesive strips 32, 34, on each side of the joint in end zone 15 region on the outer surface jacket 16. The adhesive strips 32, 34 facilitate the bonding of a casing 36. Sometimes, the adhesive strips 32, 34 are pre-bonded to the inside surface of the casing end zone 15. Once the adhesive strips 32, 34 are applied, the next step, shown in FIG. 4, is the placement of the casing 36 over top of the joint. The casing 36 overlaps the outer surface jacket 16 at end zones 15, also overlapping the adhesive strips 32, 34. Since the diameter of the casing 36 is larger than the diameter of the outer surface jacket 16, there exists a gap 39 between the outer surface jacket 16 and the casing 36. A plurality of spacers 37 are used to create a uniform distance between the casing 36 and the outer surface jacket 16, i.e. to ensure that gap 39 is about the same length through the circumference of the casing 36. Each spacer 37 is typically an "L" shaped piece of plastic or metal. One end of the spacer 37 is held in place by being pushed into the insulation 14; the casing 36 rests on the other end.

Once the casing 36 is properly positioned as shown in FIG. 4, the casing 36 is bonded to the outer surface jacket 16 as shown in FIG. 5. Portions of casing 36 proximal to adhesive strips 32, 34 are heated utilizing a torch flame 35. Optionally, and as shown, a heat shield 38 is utilized to prevent heat from the torch flame 35 from damaging the casing. Air gap 10 is also shown.

Figure 6:
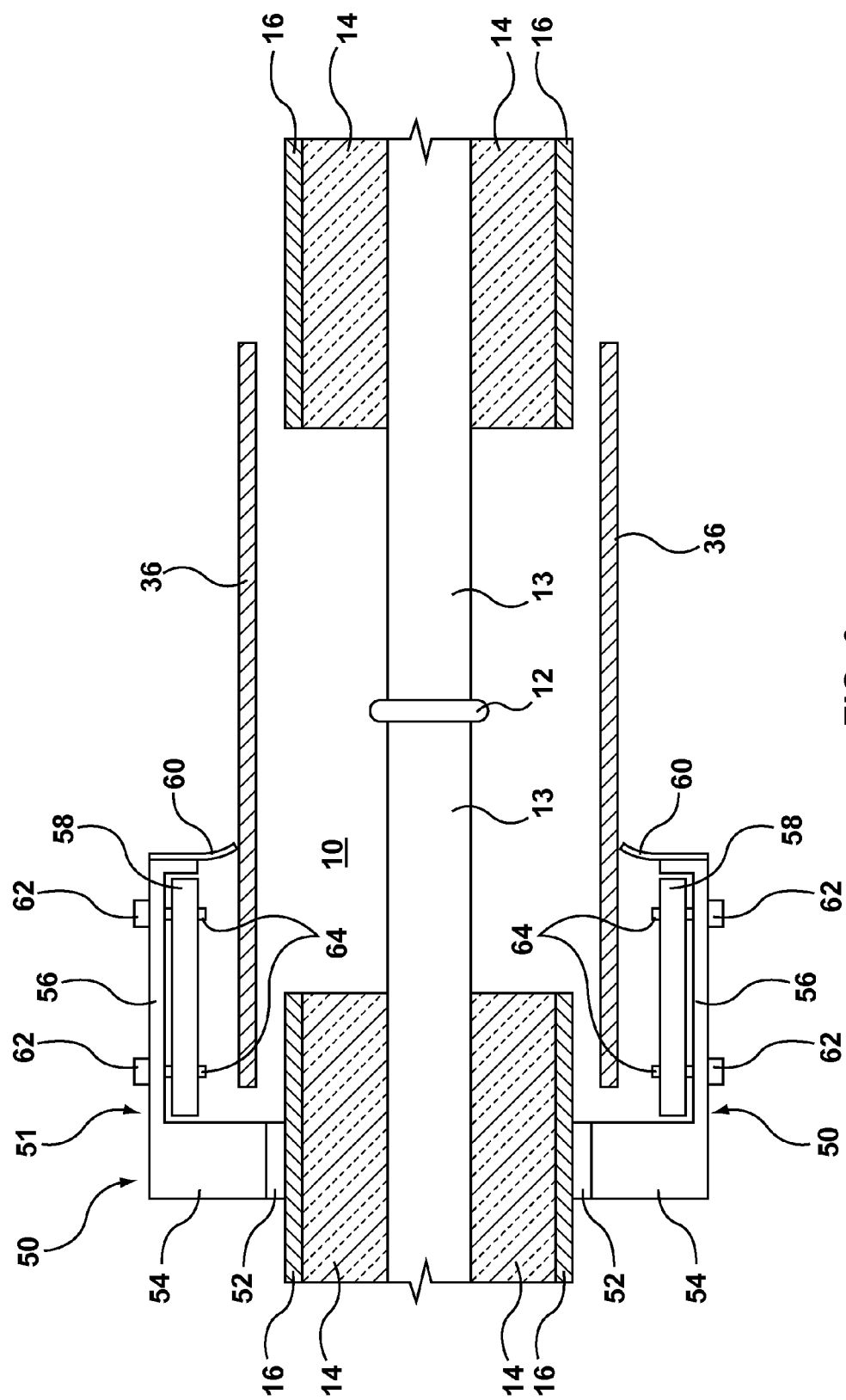
FIG. 6 shows a schematic representation of a cross section of an apparatus of the present invention, clamped to a pipe joint.

FIG. 6 shows a cross-section of a district heating pipe, connecting two sections of district heating pipe, or one section of district heating pipe to a district heating pipeline, on which an apparatus of the present invention is mounted. Apparatus 50 comprises a plurality of similar or identical components 51 wrapped around the pipe. As would be appreciated, since a cross-section is shown in FIG. 6, only two of these components 51 are shown, one above pipe 13, the second below pipe 13. Each component 51 comprises mount 52 which is capable of mounting onto the outer surface jacket 16. As shown, mount 52 is clamp mounted to outer surface jacket 16. Of particular note is that, in certain preferred embodiments, apparatus 50 is, instead, clamp mounted to casing 36. This is counter intuitive, since the casing is typically flexible, less than rigid, and may change diameter during the heat shrinking process.

Mount 52 is attached to frame 54, which in turn is attached to apparatus outer casing 56 comprising heater 58. The heater 58 is in the form of a resistive heating plate (not shown in FIG. 6).

The component 51 also comprises heat shield 60, which may contact the casing 36 when in use, and which traps heat generated by heater 58 within the space between the apparatus and the casing 36. Also shown in FIG. 6 are terminals 62, which connect each of the components 51 of the apparatus and distribute electric energy thereto. Spacers 64, which are optional, but are shown in FIG. 6, ensure a defined minimum distance between heater 58 and casing 36.

Figure 7:
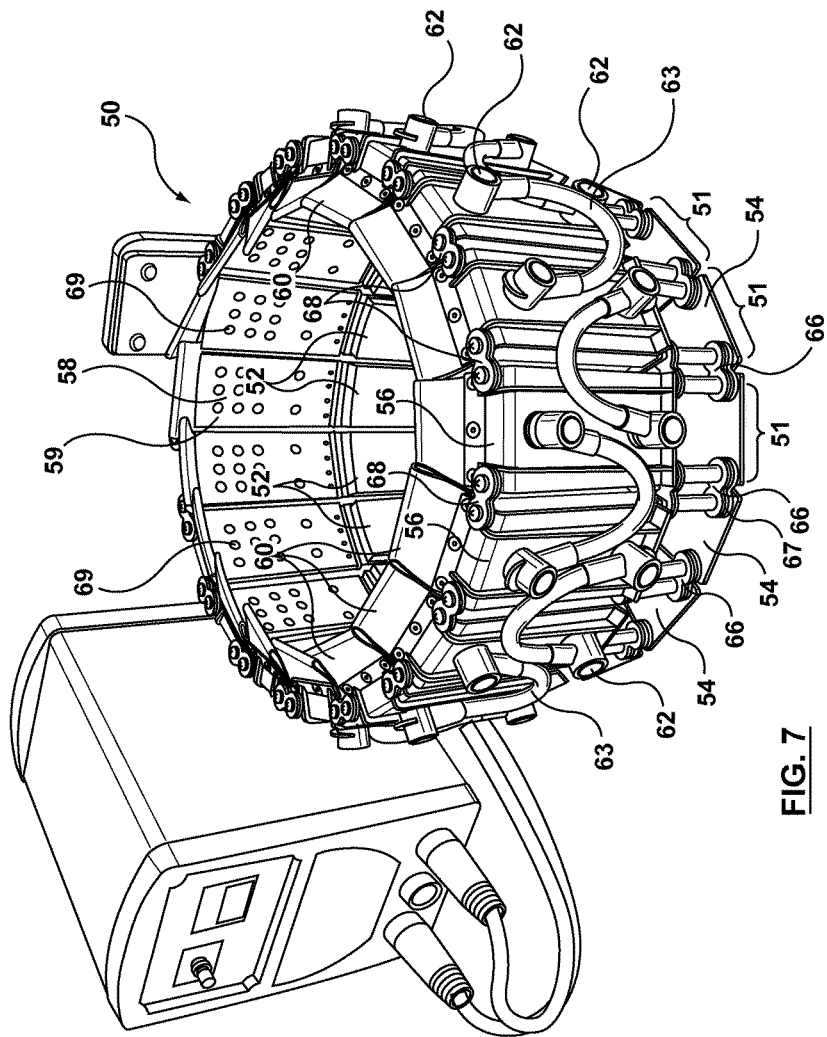
FIG. 7 shows a photograph of an apparatus of the present invention.

FIG. 7 shows a photograph of an apparatus of the invention, attached to a standard, typical, prior art power supply. Apparatus 50 comprises a plurality (in this example, 17) near identical, modular components 51. The figure shows mount 52, connected to frame 54. Also shown is outer casing 56 connected to shield 60. Heater 58 in the form of heating plate 59 is also shown, in the inner portion of the apparatus 50. In this embodiment, the heater 58 does not comprise spacers. Two terminals 62 are shown on each outer casing 56, and the terminals 62 are connected by wire 63.

FIG. 7 also shows how components 51 are connected. Hinge region 66 connects each of the frames 54 to one another in a flexible, hinge-like assembly. As shown, primary hinge region 66 comprises a plurality of rubber connectors 67, which provide some flexibility, extensibility and "give" to allow for clamping the apparatus onto a pipe. However, in embodiments utilizing a compressible mounting pad 53 (described further below), the primary hinge region 66 can be made of a rigid connector, with the function of flexibility, extensibility and "give" provided by the compressible mounting pad 53 instead of the connectors 67. Also shown, but largely optional, is distal hinge region 68, which generally stabilizes the configuration of components 51 relative to one another.

FIG. 7 also shows electrical connections between components, in the form of terminals 62 and wire 63. Adjacent components 51 are connected externally through terminals 62 by wire 63 to form a parallel or a series electrical connection network, as desired to meet the voltage or current requirements of the power supply to which the apparatus is connected. The plurality of wires 63 connecting adjacent components 51 form a network which provides power to all of the components 51. Wires 63 may be added or removed by plugging into or unplugging from terminals 62.

FIG. 7 also shows holes 69 in heating plate 59, which are used to provide a graduated heat output from one side of the heating plate (proximal to the frame 54) and the other (proximal to heat shield 60). This graduated heat output will be described further, below.

Figure 8:
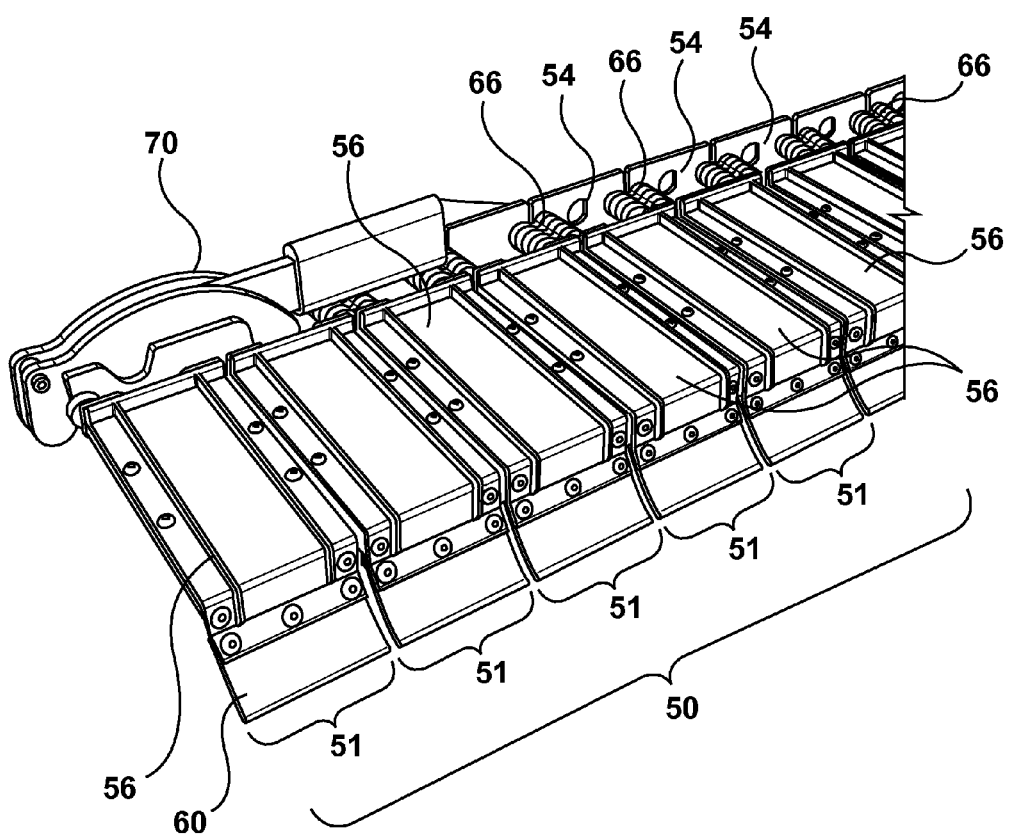
FIGS. 8-10 show 3 dimensional renderings of an apparatus of the present invention.

FIG. 8 shows a perspective view of a CAD drawing of a further embodiment of a portion of the present invention. Shown is apparatus 50 comprising a plurality of components 51 each having frame 54 connected to outer casing 56 of the heater. Primary hinge region 66 is also shown. Notable is that this embodiment does not have secondary hinge region 68, nor does it have external terminals or wires electrically connecting the components. Instead, the electrical connection between the components 51 is internal to the heater 58, below outer casing 56, and not shown. Also shown in FIG. 8 is clamp region 70, which will be further described below.

Figure 9:
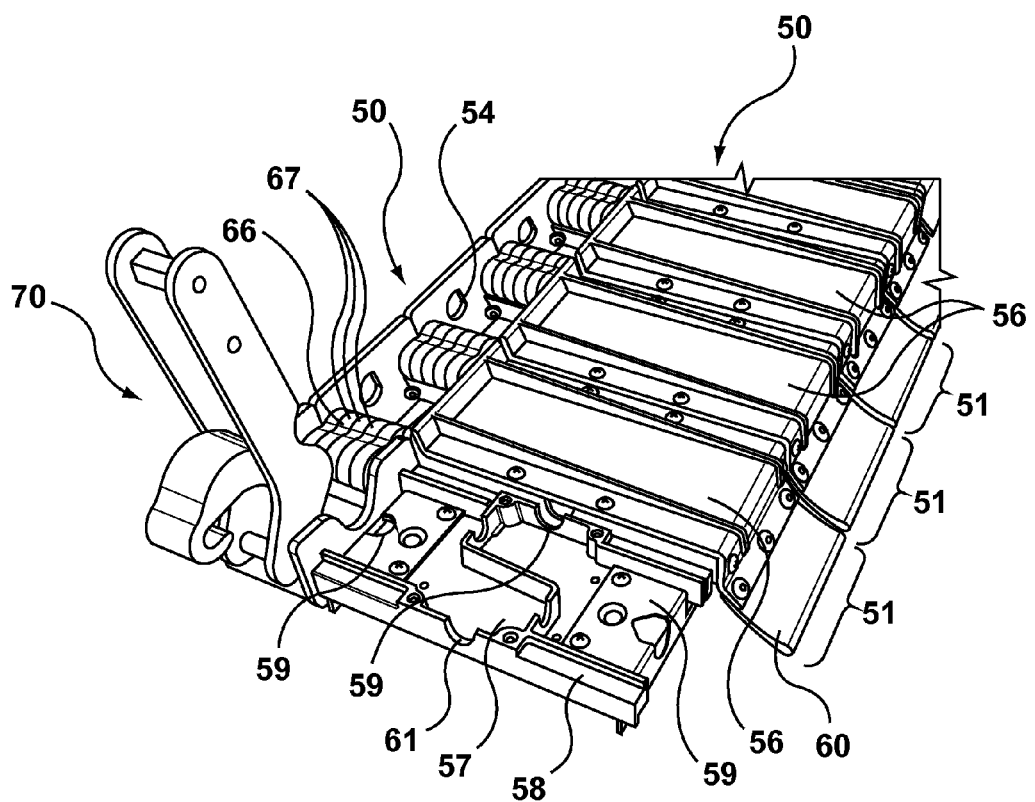

FIG. 9 shows a further perspective view of a CAD drawing of a further embodiment of a portion of the apparatus of the present invention. Shown is apparatus 50 comprising a plurality of components 51 each having frame 54 connected to outer casing 56 of the heater 58. Primary hinge region 66 is also shown, comprising a plurality of rubber connectors 67. Also shown is heat shield 60. Component 51 closest to the bottom of the figure is shown without outer casing 56, to illustrate the components of heater 58. Heater 58 comprises an intermediate plate 57, situated between heating plate 59 and outer casing 56 and connected to each. As shown, heating plate 59, which, as would be appreciated, is mostly not shown as it is situated on the bottom of the apparatus, curves 180 degrees at each end and thus has two connecting regions on the top of intermediate plate 57. Also shown in intermediate plate 57 are internal connection grooves 61, utilized to pass wires (not shown) from one component 51 to the next and to transmit electrical energy to heating plate 59. Clamp region 70 is also shown in more detail, and is utilized to clamp one end of the apparatus 50 to the other end, and to provide clamping hoop stress to the apparatus 50 when wrapped and clamped around a pipe outer surface jacket or casing.

Figure 10:
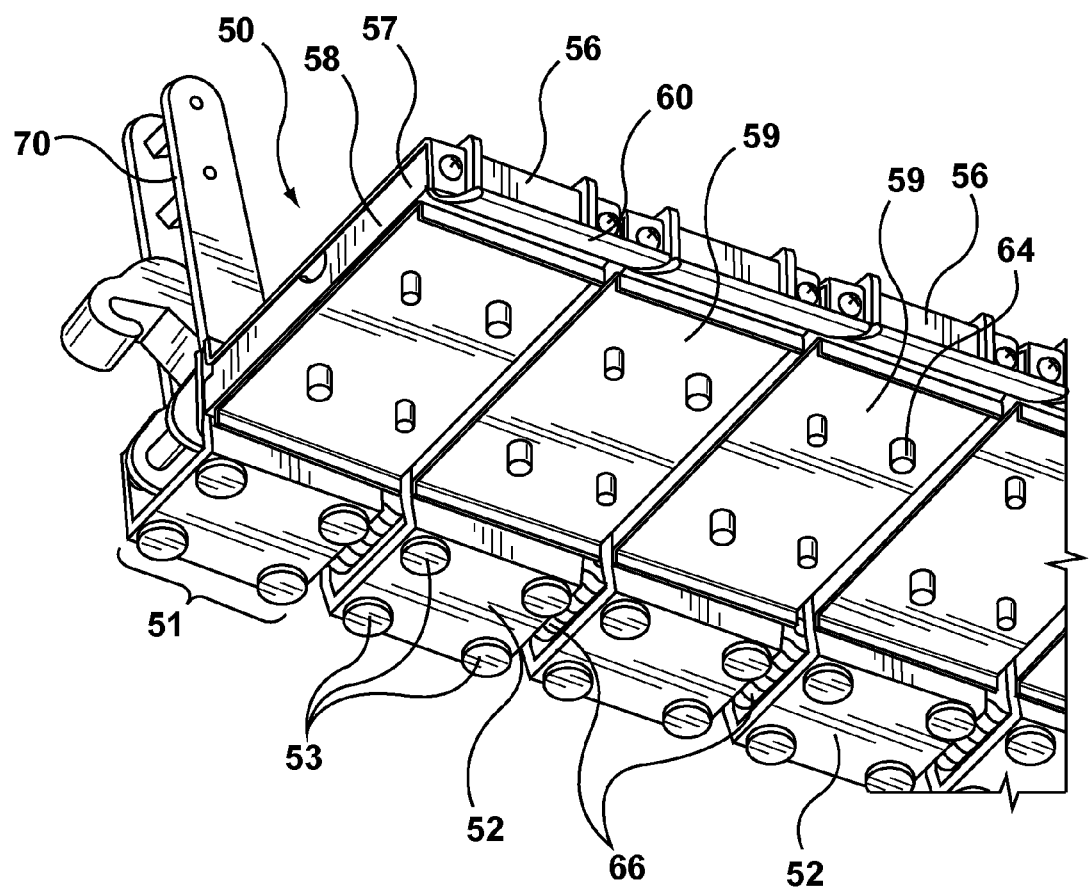

FIG. 10 shows the underside of the apparatus of FIG. 8. Shown is apparatus 50 having components 51, each of which having mount 52 connected to a frame (not shown) which is in turn connected to heater 58. Heater 58 comprises intermediate plate 57, outer casing 56, heating plate 59, and heat shield 60. As shown, heating plate 59 comprises spacers 64. Also shown in FIG. 10 are mounting pads 53, which are optional, but which are located on mount 52 and contact the pipe outer surface jacket when the apparatus 50 is clamped to the pipe or casing. Mounting pads 53 may be or comprise a compressible pad, which provides flexibility to adapt to different diameters of pipe, or to different closed loop lengths. In certain preferable embodiments, the compressible pad is made from a viscoelastic foam. As discussed above, in embodiments utilizing a compressible mounting pad 53, the primary hinge region 66 can be made of a rigid connector rather than a rubber connector 67, with the function of flexibility, extensibility and "give" provided by the compressible mounting pad 53 instead of the rubber connector 67.

Figure 11:
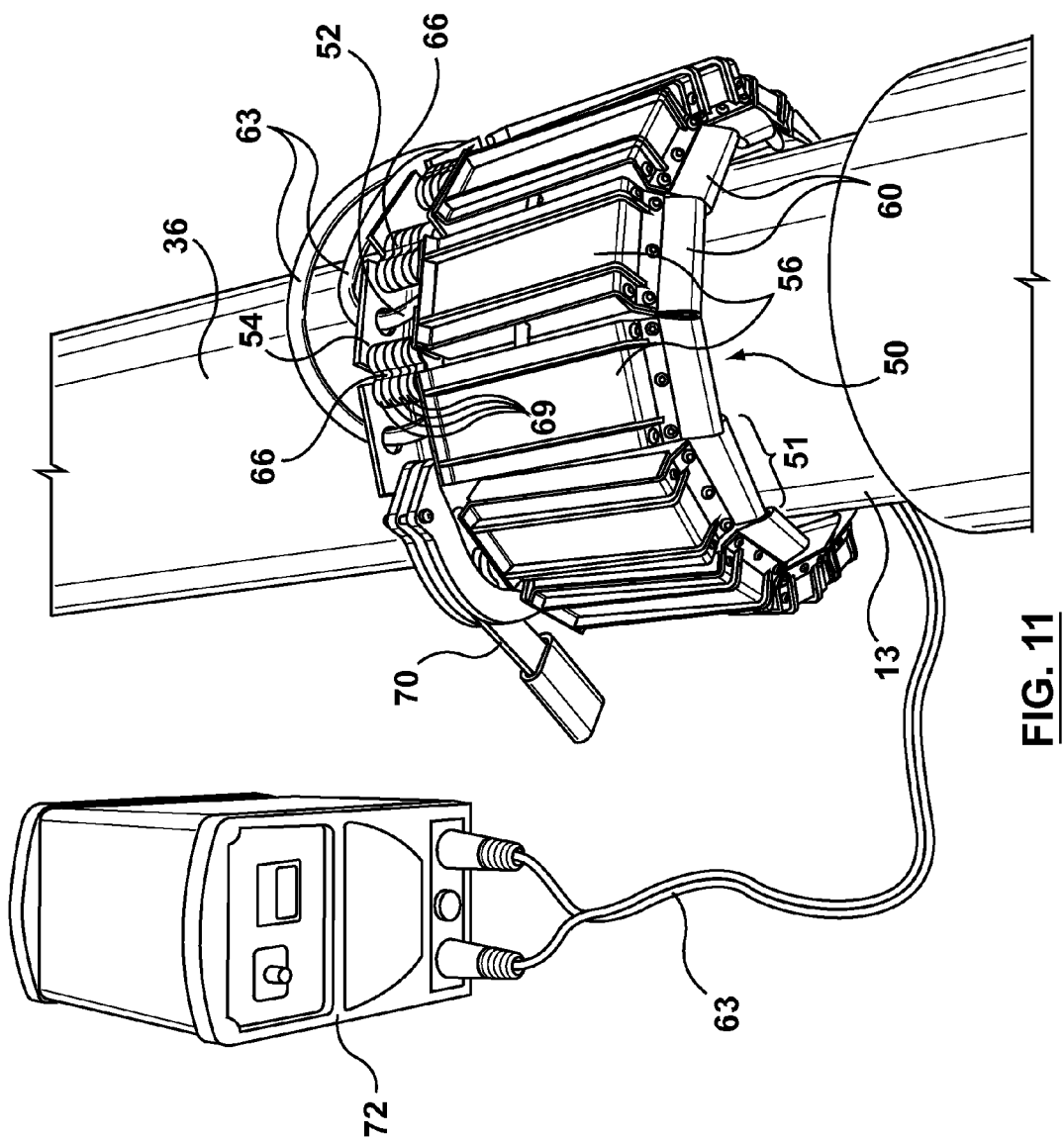
FIGS. 11 and 12 show photographs of an apparatus of the present invention, clamped around a casing on a pipe.
Figure 12:
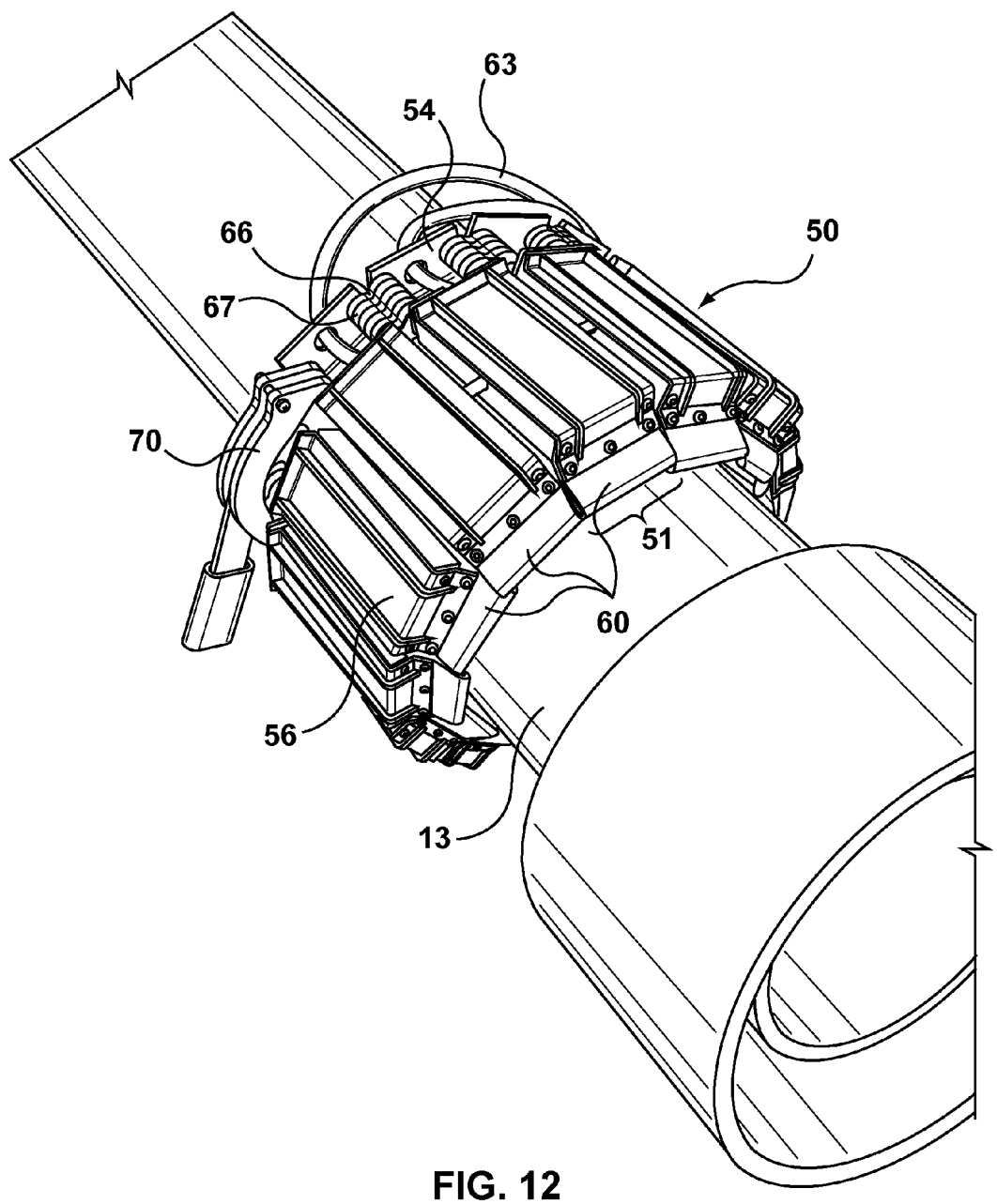

FIGS. 11 and 12 show photographs of an apparatus of the invention in use. Shown is pipe 13 wrapped with casing 36, and the apparatus 50 wrapped around the casing 36 and pipe 13. Apparatus 50 comprises a multitude of components 51, each having a mount 52 on which the apparatus 50 is mounted to the pipe 13 outer surface jacket 16. Mount 52 is a part of frame 54 which is attached to heater 58 comprising outer casing 56, intermediate casing (not shown) and heating plate (not shown). Also shown is heat shield 60 and clamp region 70. In this embodiment of the invention, as can be seen, wire 63 is connected through the frame 54 and into the intermediate plate 57, to connect to the heating plate (not shown). Wire 63 is then connected to a standard electrical power supply 72.

In certain embodiments, the apparatus of the invention is modular, and field configured to the diameter required, by adding or removing components. The hinge region 66 on each component 51 creates a flexible band (much like a watch band) from the plurality of frames 54. In certain embodiments, the heating plate 59 is a resistive foil heater, tuned for deep penetration with 50-100% of the heat energy being in the infra-red range, and the device is run in a high current, low voltage configuration to minimize shocking the user. For example, it was found that an 8-35 volt, 200 amp current will heat the heating plate 59 to about 400° C., which is ample heat for shrinking and bonding the casing 63 to the outer surface jacket 16 for casing size of 355 mm diameter. This was powered by a power supply of 5 kw. The benefit of such unique electrical configuration is that while it can provide sufficient heat to shrink the casing, a person accidentally touching the live wires will not get a serious injury. Further, if the wires of the component come into contact with water and/or mud, it will not short out. In order to address the described safety and functional requirements for the apparatus, it was determined that the voltage should be maintained below 40 volts, preferably below 25 volts. It was also found that the amperage required to shrink casings in the range of 50 mm to 1200 mm pipe size, was 15-300 amps, preferably in the 40-200 amps range. The power supply to energize the apparatus to cover this range of was found to be in the 0.5-15 KW range and preferably in the 1-8 KW range.

In certain embodiments, each component 51 is connected in series with an external cable. In other embodiments, the components are connected with internal cable.

Figure 13:
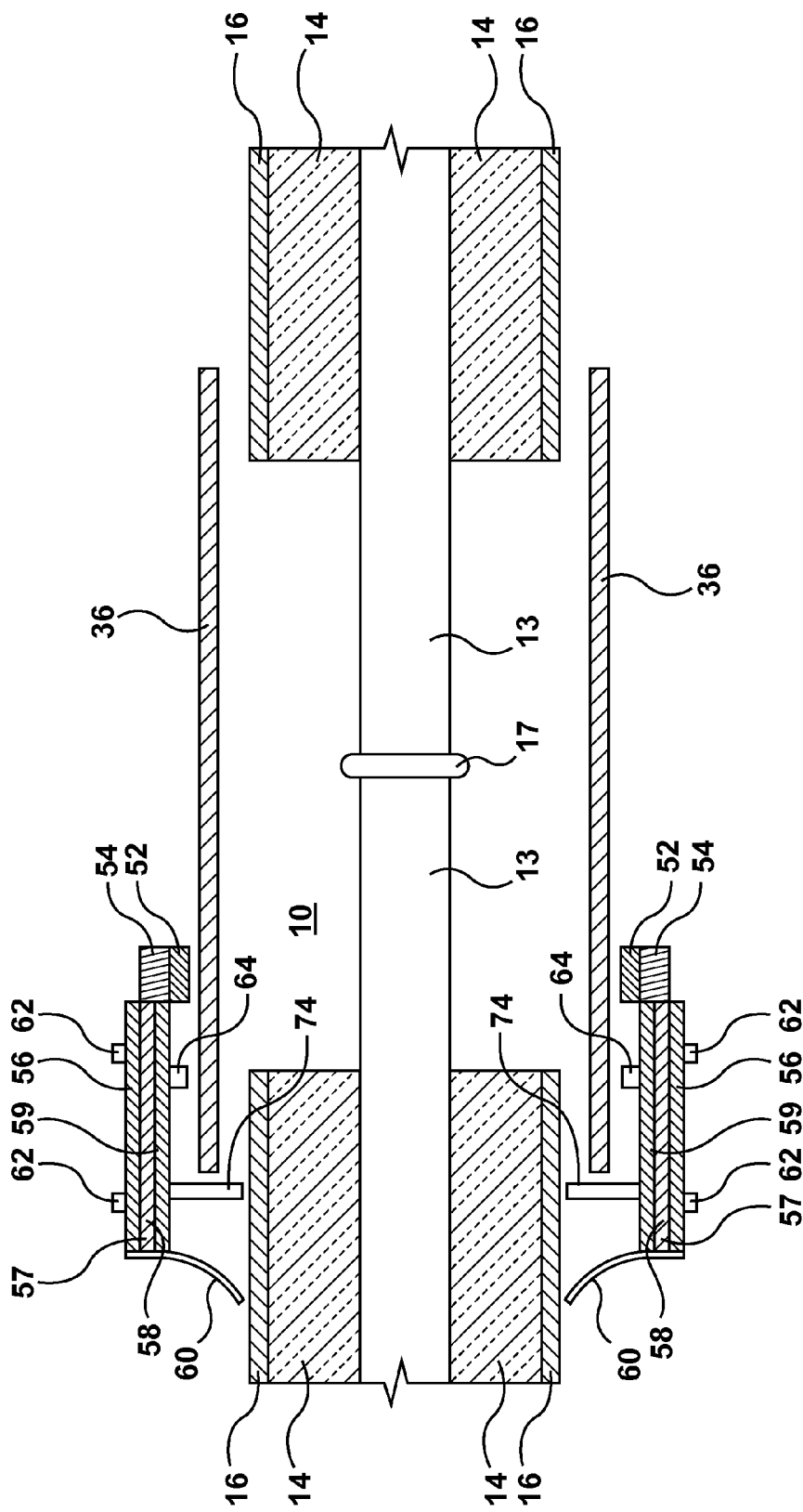
FIGS. 13 and 14 show schematic representations of a cross section of an apparatus of the present invention, clamped to a casing surrounding a pipe joint.

It is important to note that, in certain embodiments, as shown in FIG. 6, the mount portion of the hinge region is mounted on the outer surface jacket 16, with the heater overhanging the casing 36. However, in other, preferred, embodiments, as shown in FIGS. 11-13, the mount portion of the heat region is mounted on the casing itself, with the heater portion overhanging the casing, and heat shield 60 forming a heat barrier as it touches the outer surface jacket 16. In these embodiments, the device actually contacts the casing, through the mount 52 (though the heating plate itself does not actually contact the casing).

Also shown in FIG. 13 is spacer 74, which is used as an alignment aid, to place the mount 52, and accordingly heater 58, at an appropriate longitudinal location on the casing 36. This, in effects, indexes the casing 36 to the appropriate location on the pipe. Spacer 74 can also, optionally, act as a secondary support, by resting on outer surface jacket 16.

Clamp region 70, as shown, has a 4 inch stroke from open to close, but can provide a 1-10 inch stroke, depending on pipe size. The clamp region allows the two ends of the apparatus to be joined, and clamped to the pipe or casing.

Figure 14:
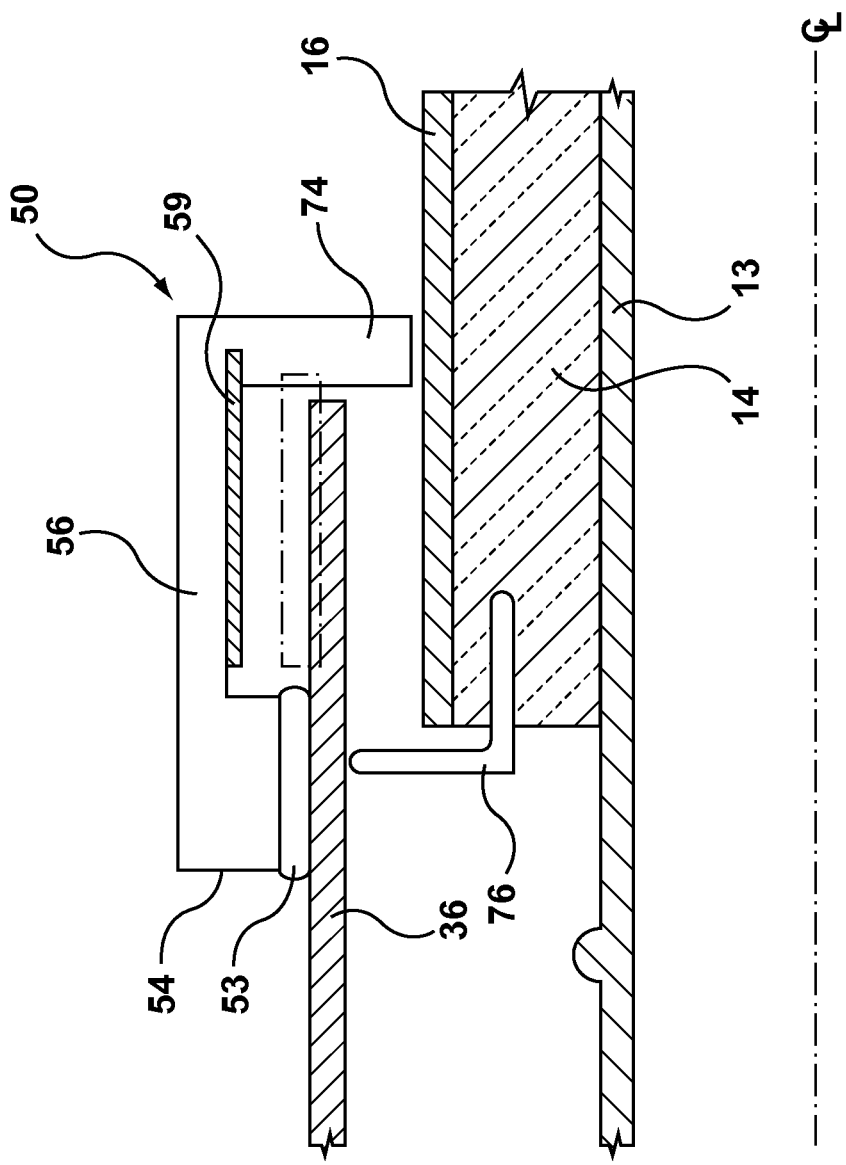

FIG. 14 shows a schematic cross section of the apparatus 50 of the present invention clamped to a casing 36. Apparatus 50 comprises mounting pad 53 connected to the mount 52 section of frame 54, which is connected to outer casing 56 which houses heating plate 59. Spacer 74 aligns the apparatus 50 to the appropriate position on casing 36 to provide heat at the appropriate location. Also shown in FIG. 14 is spacer 76, equivalent to spacer 37 in prior art FIGS. 3-4, which is used to separate casing 36 from outer surface jacket 16 an appropriate distance so that the distance between the two, around the perimeter of the casing 36 is generally equal.

Figure 15:
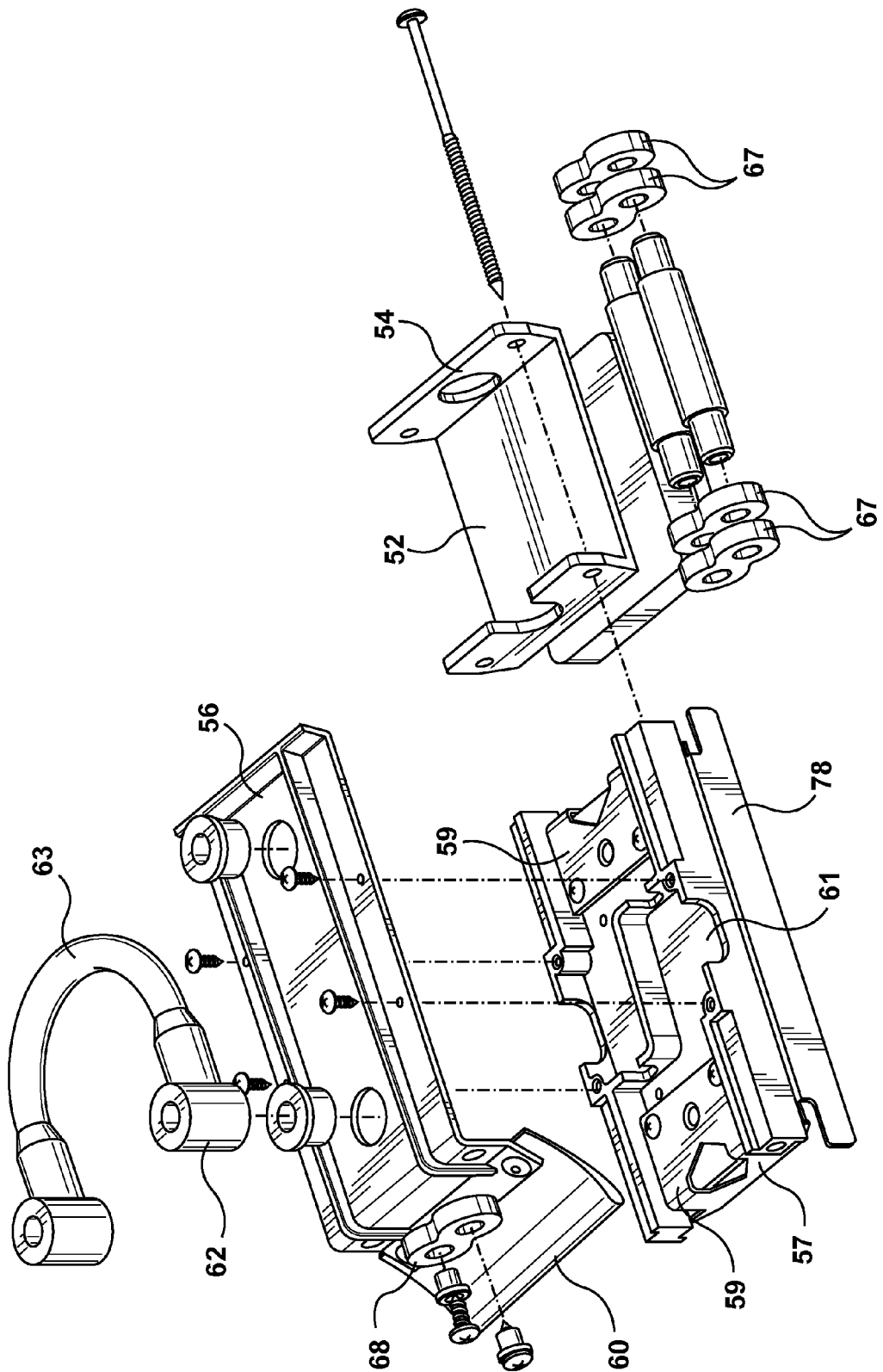
FIG. 15 is an exploded view rendering of a component of the apparatus of the present invention.

FIG. 15 shows an exploded view of one component 51 of the apparatus. Shown is frame 54 comprising hinge region 66 made of rubber connectors 67. Also shown is intermediate plate 57, to which heating plate 59 is attached. Only the ends of heating plate 59 are shown, as they wrap around intermediate plate 57; the primary area of heating plate 59 is under the intermediate plate 57 as shown. Also shown is spacer 78, which provides a defined minimum distance between heating plate 59 and casing 36 when the apparatus is applied to the casing, and prevents heating plate 59 from contacting casing 36. Outer casing 56, comprising heat shield 60, is also shown, as are terminals 62 and the wire 63 connecting said terminals 62. Secondary hinge region 68 is also shown. In certain embodiments, spacer 78 and heat shield 60 may be made of one part.

Figure 16:
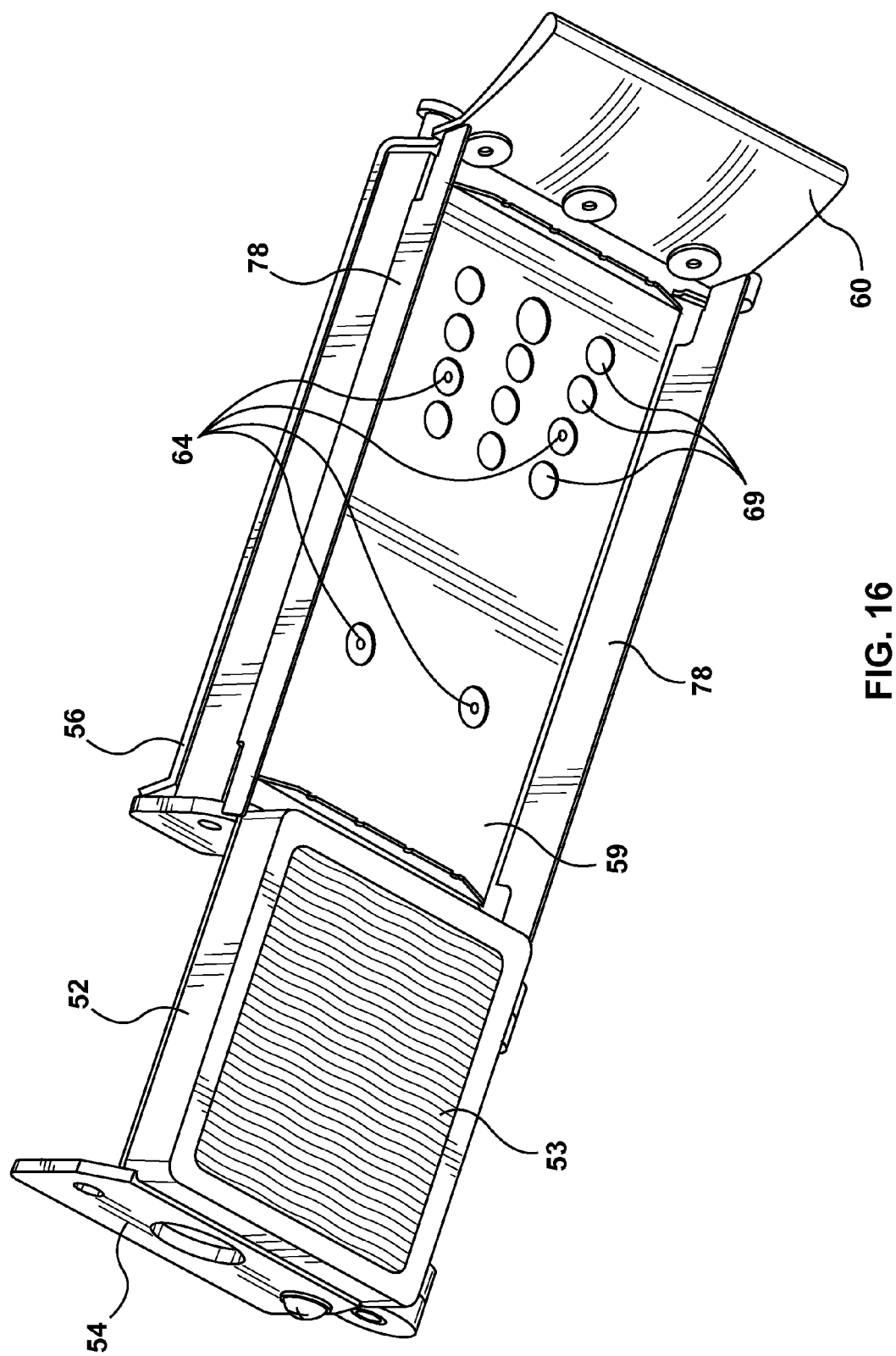
FIG. 16 shows the underside of a component of the apparatus of the present invention.

FIG. 16 shows the underside of a component 51 of the apparatus. This is the side that clamps to casing 36. Shown is mounting pad 53, on the lower surface of mount 52 which is a part of frame 54. Shown also is heating plate 59, comprising ceramic spacers 64 as well as holes 69. As would be appreciated, the holes 69 increase the resistance in the portion of heating plate 59 distal to mounting pad 53, and accordingly, in use, the portion of the heating plate 59 distal to mounting pad 53 will provide more heat and IR energy than the portion of the heating plate 59 proximal to mounting pad 53. Also shown are spacers 78 and heat shield 60.

Figure 17:
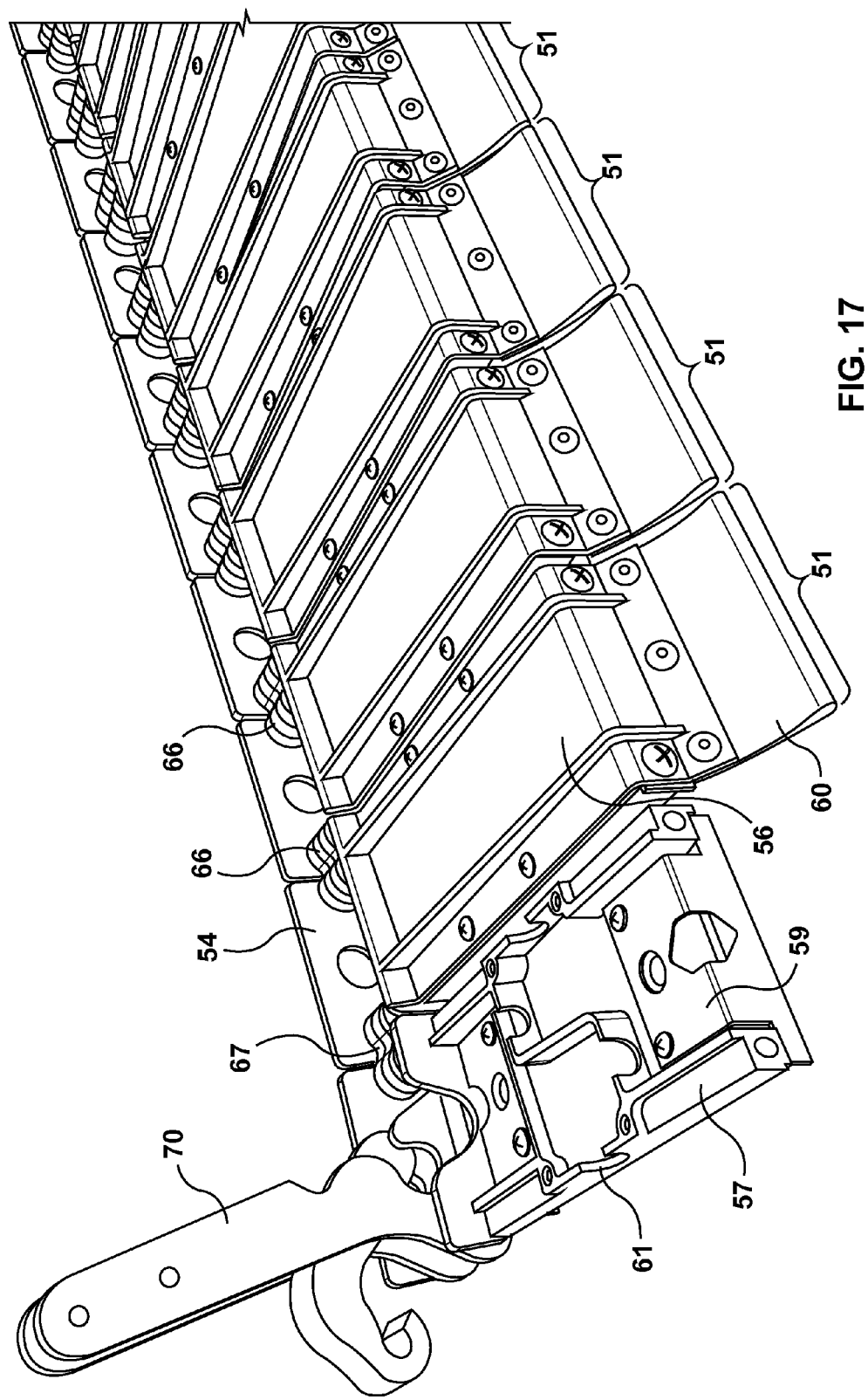
FIG. 17 shows a three dimensional rendering of an apparatus of the present invention.

FIG. 17 shows the apparatus of the present invention, including clamp region 70 and a plurality of components 51. As shown, the outer casing 56 is absent from the component having clamp region 70, so that the intermediate plate 57 and heating plate 59 can be seen. As would be appreciated, when in use, the outer casing 56 would be present.

The apparatus, as described herein, is simple, mass-producible, inexpensive to make, use, and operate, and hand portable. In many prior art applications, the heaviest and bulkiest item for a contractor fixing a casing onto a pipe at a pipe weld is a 20 lb propane tank, plus hoses and torch, with an approximate total weight of 25-30 lbs. The present apparatus replaces that with a light, safe, apparatus which is easy to carry by one person and can be carried safely in a closed ditch and/or in inclement weather.

In certain embodiments, heating plate 59 is tuned and calibrated for differential heat, with more heat proximal to spacer 74 and less heat (about 25-35% less) at the frame 54 end. This is done through the placement of holes 69 in the heating plate 59, which change the resistance of the heating plate 59 in the area surrounding the holes 69.

In certain embodiments, the heating plates 59 are coated with an emissive high temperature coating to improve transmission of medium to long wave infra-red radiation. Heating plates 59 may also be constructed of multiple materials or multiple sections, laminated or end-joined to provide a zoned heating effect. Heating plates 59 may also be zoned with zones individually controlled or throttled to create a zoned heating effect.

In certain embodiments, spacers 64 are fixed to heating plate 59. The spacers 64 are temperature resistant, typically ceramic, and act to keep a minimum distance between the heating plate 59 and the casing 36. It is generally undesirable for the heating plate 59 to contact casing 36 when hot.

Intermediate plate 57 is preferably an injection moulded, heat resistant housing. Primary hinge region 66 comprises a plurality of connectors 67, which are typically rubber, and can be fiber or nylon reinforced. The connectors 67 provide a certain amount of give and elasticity to allow for the clamping of the apparatus to the casing 36 or outer surface jacket 16.

Mount 52 is typically a high temperature flexible foam, for example, silicon foam or a bilayer of silicon foam with a rubber pad, to provide additional elasticity and flexibility for clamping.

In certain embodiments, the apparatus is thermostatically controlled using a measure of the voltage on the line and a set current. In certain embodiments, the apparatus comprises one or more temperature sensor which can detect the surface temperature at the start of the process and automatically adjust the cycle.

The apparatus is particularly advantageous when applying non-crosslinked heat shrinkable casings. Belmaflex A/S (Farso, Denmark) manufactures non-crosslinked heat-shrinkable casings that are bonded to the jacket with an adhesive. These casings are fabricated by expanding an extruded casing at near the melting point of the polyethylene, and therefore the expanded casing has lot of cold stresses. While the casing will shrink readily when sufficient heat is applied, upon application of slight excessive heat, the casing will go above the melting point and loses shrinkability, conversely, will start to "grow" due to the coefficient of thermal expansion. Thus it would provide little hoop stress and would likely have a gap between the casing the substrate. The apparatus of the present invention is particularly advantageous for non-crosslinked casings as they have a very narrow window of heat input for proper application. The apparatus of the present invention can provide such precision heat by providing controlled heat all around the such casing so that any excessive heating is eliminated.

As can be seen by a person of skill in the art, a further advantage of the apparatus of the present invention is that it can be fitted around a pipe with very limited pipe access, for example, pipe in a dug ditch with a second, parallel pipe running in close proximity. Typically, district heating pipeline has a small gap (about 1 foot) between two pipes running in parallel; the gap underneath the pipe is often as small as 9 inches. The apparatus requires very little space on each side of the pipe for fitting to the pipe, can be fitted to surround the pipe with very little clearance at the bottom of the pipe.

Yet a further improvement of the present apparatus over the prior art is that the apparatus, when fitted to a pipe, is self-supported on the casing. This provides a consistent quality of casing shrinking, since the hoop stress imparted by the clamping of the device onto the casing actually helps evenly distribute the hot casing onto the pipe outer surface coating.

FIGURE LEGEND

Gap 10
Pipe 11
Pipeline 12
Pipe 13
Insulation 14
End zone region 15
Outer surface jacket 16
Joint 17
Adhesive strips 32 34
Torch flame 35
Casing 36
Spacers 37
Heat shield 38
Gap 39
Apparatus 50
Component 51
mount 52
mounting pads 53
frame 54
outer casing 56
intermediate plate 57
heater 58
heating plate 59
heat shield 60
internal connection grooves 61
terminals 62
wire 63
spacers 64
primary hinge region 66
rubber connectors 67
secondary hinge region 68
holes 69
clamp region 70
power supply 72

The invention claimed is:

1. An apparatus for heating of a heat shrinkable casing surrounding and disposed around a joint in a pre-insulated pipe, for sealing or bonding said one or more end portions to an outer surface jacket of said pipe, said apparatus comprising:
   a plurality of components, each component having:
   a frame, said frame comprising a mount region with a mounting face;
   said frame having attached thereto a heater, said heater comprising a heating plate and a temperature resistant outer casing;
   at least one hinge region, the hinge region connecting said plurality of components to one another to form a flexible, articulated length having two ends, said articulated length configured so that the mounting face of each component faces in the same direction;
   said plurality of components being electrically connected to one another such that a single power source can provide electrical energy to the heating plates;
   said apparatus also comprising a connecting region capable of connecting the two ends of said articulated length of frames to form a circular array of components each having a heating plate and a mounting face facing the center of the circular array and an outward facing outer casing.

2. The apparatus of claim 1 wherein said heater further comprises a heat shield located distal to the frame, and/or a temperature resistant spacer on said heating plate configured to prevent said heating plate from contacting said outer surface jacket when in operation.

3. The apparatus of claim 1 wherein the connecting region is a clamp having a stroke of 1-12 inches.

4. The apparatus of claim 1 wherein the mounting face comprises a high temperature flexible foam, preferably a silicon foam, or a bilayer of high temperature flexible foam and rubber.

5. The apparatus of claim 1 wherein the hinge region comprises a plurality of connectors.

6. The apparatus of claim 1 further comprising an alignment spacer at a distal end of the heater, relative to the frame, said alignment spacer protruding away from the heater generally perpendicularly to the heating plate.

7. The apparatus of claim 1 wherein adjacent heaters are connected electrically.

8. The apparatus of claim 1 wherein the heating element comprises at least two zones, each providing a different level of heat or infra-red energy, or a graduated level of heat or infra-red energy.

9. The apparatus of claim 8 wherein the heating element comprises at least one aperture, providing an increased resistance proximal to said aperture relative to a resistance on said heating element distal to said aperture.

10. A method for shrinking a pre-stretched casing to an outer surface jacket of a pipeline at a pipe joint, comprising:
   wrapping or placing a casing around the pipe joint so that it overlaps the outer surface jacket on either side of the pipe joint;
   clamping the apparatus of claim 1 to the casing so that the plurality of components surround the casing, each component with its mounting face clamped to the casing and its heating plate in proximity to a portion of the casing that overlaps the outer surface jacket; and
   applying electrical energy to the heating plate which utilizes said electrical energy to generate heat, which in turn shrinks the casing to the outer surface jacket.

11. A method for shrinking a pre-stretched casing to an outer surface jacket of a pipeline at a pipe joint, comprising:

wrapping or placing a casing around the pipe joint so that it overlaps the outer surface jacket on either side of the pipe joint;

clamping the apparatus of claim 1 to the outer surface jacket so that the plurality of components overhang and surround the casing, each component with its mounting face clamped to the outer surface jacket and its heating plate in proximity to a portion of the casing that overlaps the outer surface jacket; and applying electrical energy to the heating plate which utilizes said electrical energy to generate heat, which in turn shrinks the casing to the outer surface jacket.

12. A method of configuring the apparatus of claim 1 for clamping to a pipe outer surface jacket or casing, comprising:

adding or removing components of the apparatus to form an overall apparatus length appropriate for clamping to the desired pipe outer surface jacket or casing.

13. The apparatus as claimed in claim 1, having an electrical configuration and power requirement that, in operation, it is: (a) capable of shrinking the casing, (b) impervious to shorting when exposed to water, and (c) incapable of subjecting a user to a serious electric shock.

14. The apparatus as claimed in claim 13, wherein the apparatus is for use with a power supply having a voltage below 40 volts, preferably below 25 volts, an amperage of 15-300 amps, preferably 40-200 amps, and a power of 0.5-15 KW, preferably 1-8 KW.

* * * * *